Feb. 20, 1934.　　　　J. W. HUME　　　　1,947,525
GUARD FOR VEHICLE RUNNING BOARDS
Filed Oct. 2, 1931
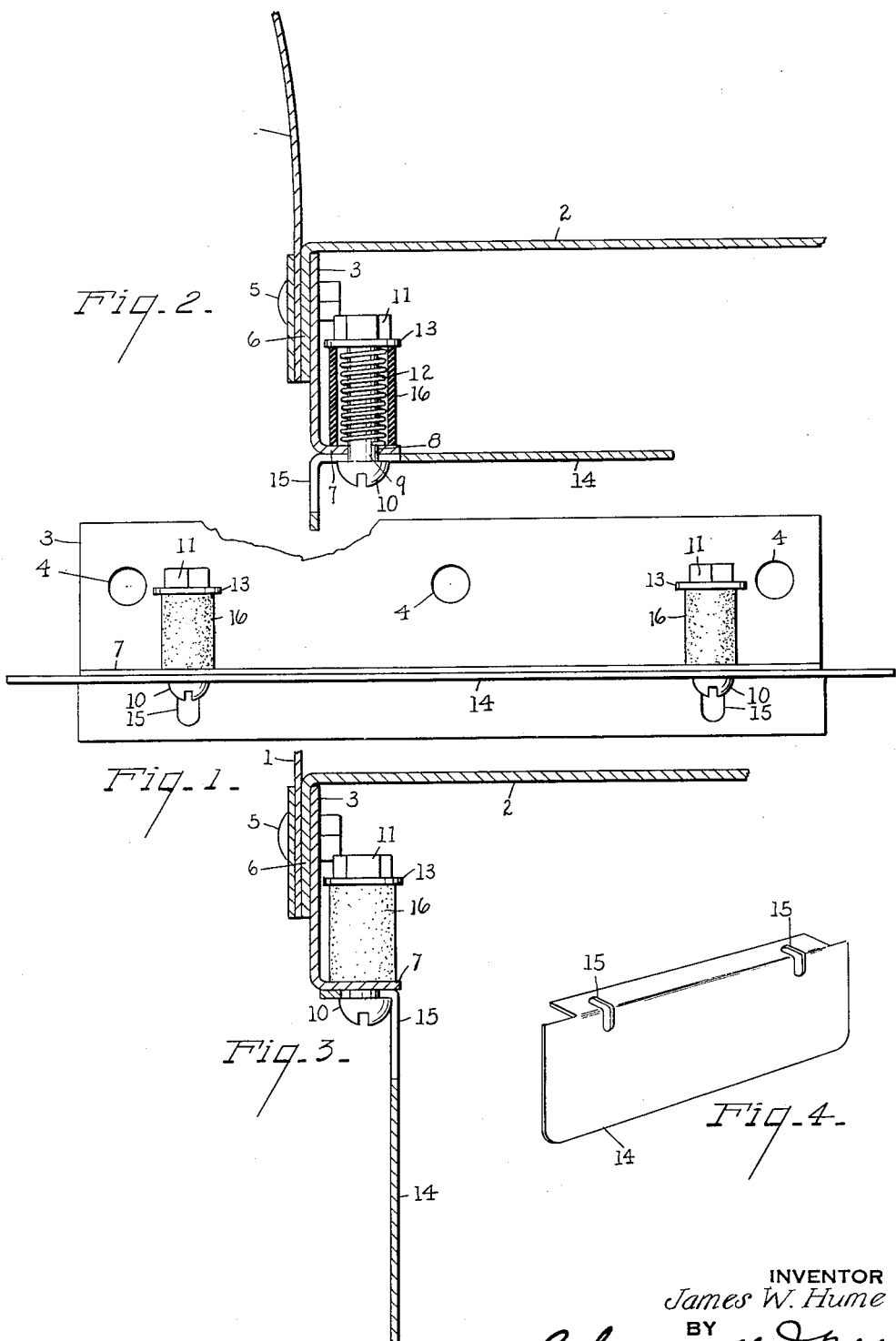
INVENTOR
James W. Hume
BY
Chappell & Earl
ATTORNEYS Patented Feb. 20, 1934

1,947,525

UNITED STATES PATENT OFFICE 1,947,525

GUARD FOR VEHICLE RUNNING BOARDS

James W. Hume, Jackson, Mich.

Application October 2, 1931. Serial No. 566,392

8 Claims. (Cl. 280—152)

The main object of my invention is to provide an improved splash guard for the running boards of automotive vehicles, which is releasably held in operative or inoperative positions.

Another object of the invention is to provide a running board attachment of this character which is simple and economical in construction and efficient in use.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary rear elevation of a splash guard, embodying my invention, adjusted to its inoperative position.

Fig. 2 is a fragmentary transverse section of the attachment mounted on the rear end of the running board of a motor vehicle, the guard being adjusted to its inoperative position.

Fig. 3 is a view partially in transverse section and partially in side elevation of the guard adjusted to its operative position.

Fig. 4 is a perspective view of the guard plate removed from its support.

Referring to the drawing, numeral 1 designates the rear fender of a vehicle, while numeral 2 indicates a running board associated therewith. As illustrated, my improved guard consists of a bracket or support 3 of substantially L-section. This bracket is provided with holes 4 for the bolts 5 by means of which the support 3 is secured to the down-turned flange 6 of the running board 2.

The support 3 is provided with spaced holes 8 in which are disposed bolts 9 having heads 10 and adjustable nuts 11 threaded thereto. The bolts 9 are surrounded by coiled springs 12, the ends of which bear against the horizontal arm of the bracket and the thrust washers 13.

The splash guard plate 14 is of substantially L-section and is provided with spaced parallel slots 15 in the angle thereof, which are aligned with spaced holes 8 in the bracket. The bolt heads 10 engage the guard 14 adjacent to the slots 15 and, by virtue of the action of the springs 12, urge the guard 14 into engagement with the base 7 of the bracket at all times. The arrangement is such that the guard 14 may be swung to the operative position as shown by Fig. 3 or to the inoperative position as shown by Figs. 1 and 2. In either case, the springs 12 hold the guard firmly in engagement or contact with the support or bracket and prevent rattling thereof.

A protective rubber-like casing 16 is disposed around each of the springs 12 and between the base 9 and washer 13. The casing 16 prevents dust and dirt from fouling the spring 12 and is highly desirable in use.

The guard 14, as illustrated, is preferably of angular shape, the angle being about 90°. If desired, this angle may, of course, be changed to suit the convenience of the user or the vehicle with which the device is used. When in its operative position, as shown by Fig. 3, the guard 14 shields the rear wheels of the vehicle from stones and the like which may be thrown backward by the front wheels. When need for the guard 14 ceases, as for example when the vehicle is running on a pavement, it may be swung upwardly to its inoperative position, as shown by Figs. 1 and 2, so as not to mar the appearance of the vehicle.

It is obvious that various changes and modifications may be made in the details of construction and design of the above specifically described embodiment of my invention without departing from the spirit thereof, such changes and modifications being restricted only by the scope of the following claims.

Having thus described my invention, what I claim as new and desire to secure by Letters Patent, is:

1. In a device of the character described, the combination with a support of substantially L-section having spaced holes in the base thereof, a guard of substantially L-section having spaced slots in the angle thereof aligned with said holes, a bolt loosely extending through the aligned slots and holes, a compression spring carried by each bolt for urging said guard into contact with said base, said slots permitting said guard to be swung through the angle of the guard, and said springs and bolts coacting to hold said guard in either of the limits of its angle, a rubber-like tubular casing surrounding each spring, and a washer disposed between the end of each casing and the nut threaded to the end of each bolt.

2. In a device of the character described, the combination with a support having spaced holes in the base thereof, a guard of substantially L-section having spaced slots in the angle thereof aligned with said holes, a bolt loosely extending through the aligned slots and holes, a spring carried by each bolt for urging said guard into contact with said base, said slots permitting said guard to be swung through the angle of the guard, and said springs and bolts coacting to hold said guard in either of the limits of its angle, a rubber-like casing surrounding each spring, and a washer disposed between the end of each casing and the nut threaded to the end of each bolt.

3. In a device of the character described, the combination with a support having spaced holes in the base thereof, a guard of substantially L-section having spaced slots in the angle thereof aligned with said holes, a bolt loosely extending through the aligned slots and holes, a spring carried by each bolt for urging said guard into contact with said base, said slots permitting said guard to be swung through the angle of the guard, and said springs and bolts coacting to hold said guard in either of the limits of its angle, and a rubber-like casing surrounding each spring.

4. In a device of the character described, the combination with a support having spaced holes in the base thereof, a guard of substantially L-section having spaced slots in the angle thereof aligned with said holes, a bolt loosely extending through the aligned slots and holes, and a spring carried by each bolt for urging said guard into contact with said base, said slots permitting said guard to be swung through the angle of the guard, and said springs and bolts coacting to hold said guard in either of the limits of its angle.

5. In a device of the class described, the combination with a support having spaced holes therein, of resiliently supported bolts disposed in said holes, and a splash guard of angular section having spaced parallel slots in the angle thereof to receive said bolts, whereby said guard may be turned through the angle of said section and held at the limits thereof.

6. In a device of the class described, the combination with an angular supporting bracket mounted with one arm in a horizontal position, of an angular guard plate having slots at its angles, bolts disposed through the horizontal arm of said bracket engaging said slots of said guard plate, and springs yieldingly supporting said bolts.

7. In a device of the class described, the combination with a support, of an angular guard plate having spaced right-slots at its angle, bolts disposed through said support engaging said slots of said guard plate, and springs yieldingly supporting said bolts.

8. The combination with a vehicle fender, and a running board having a downturned flange associated with the end of said fender, of a support of substantially L-section secured to said flange and having spaced vertical holes in its flange, a splash guard plate of inverted substantially L-section and having spaced slots in the angle thereof registering with the spaced holes in said support, members disposed through said slots and holes for connecting the support and plate in assembled relation, and resilient means associated with said members for urging the plate into engagement with said support, whereby the plate is held in depending operative position and can be swung to and held in horizontal inoperative position under said running board.

JAMES W. HUME.